(12) United States Patent
Kameoka

(10) Patent No.: US 7,637,555 B2
(45) Date of Patent: Dec. 29, 2009

(54) DOOR PANEL STRUCTURE AND METHOD OF PRODUCING THE SAME

(75) Inventor: Hidenori Kameoka, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 162 days.

(21) Appl. No.: 11/896,687

(22) Filed: Sep. 5, 2007

(65) Prior Publication Data

US 2008/0073932 A1    Mar. 27, 2008

(30) Foreign Application Priority Data

Sep. 26, 2006    (JP)    ............... 2006-260355

(51) Int. Cl.
*B60J 5/04*    (2006.01)
(52) U.S. Cl. ..................... 296/146.6; 49/502
(58) Field of Classification Search ............. 296/146.6; 49/502

See application file for complete search history.

(56) References Cited

U.S. PATENT DOCUMENTS 5,168,670 A    12/1992    Umeda

FOREIGN PATENT DOCUMENTS

| DE | 195 27 333 A1 | 2/1996 |
|---|---|---|
| DE | 199 29 872 A1 | 1/2001 |
| DE | 100 38 200 A1 | 2/2002 |
| EP | 1 679 212 A1 | 7/2006 |
| EP | 1 702 779 A1 | 9/2006 |
| JP | 62-001626 | 1/1987 |
| JP | 7-32884 | 2/1995 |
| JP | 2000-355219 | 12/2000 |

*Primary Examiner*—Joseph D Pape
(74) *Attorney, Agent, or Firm*—Drinker Biddle & Reath LLP

(57) ABSTRACT

A door panel structure including a door panel and a door waist reinforcement connected to the door panel. The door waist reinforcement includes an inner reinforcement and an outer reinforcement. The door panel and the door waist reinforcement have respective upper end portions which form a waist flange to which a weather strip is fitted. The waist flange includes a plurality of connecting portions at which the upper end portion of the door panel and the upper end portion of the door waist reinforcement are connected to each other, and at least one spaced portion at which the upper end portion of the door panel and the upper end portion of the door waist reinforcement are spaced from each other.

10 Claims, 9 Drawing Sheets

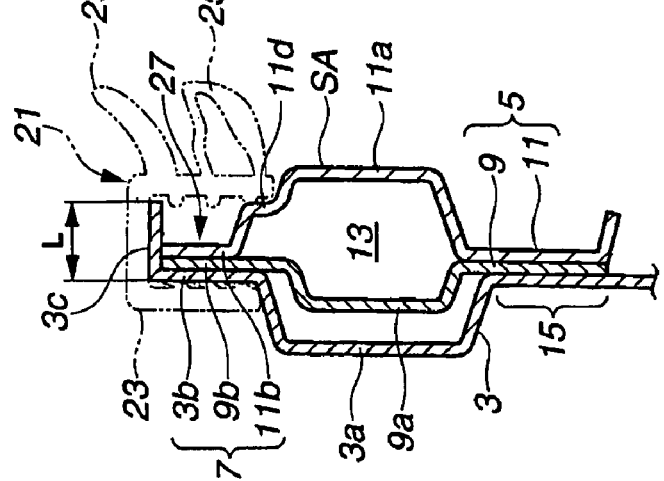
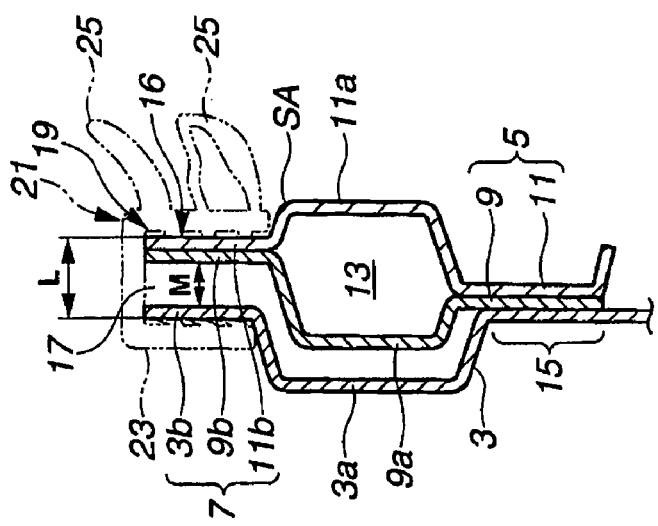

DOOR PANEL STRUCTURE AND METHOD OF PRODUCING THE SAME

CROSS-REFERENCE TO RELATED APPLICATIONS

This application claims priority under 35 U.S.C. § 119 to Japanese Patent Application No. 2006-260355, filed on Sep. 26, 2006, the disclosure of which is incorporated by reference herein in its entirety.

BACKGROUND OF THE INVENTION

1. Field of the Invention

The present invention relates to a door panel structure for an automobile, in which a weather strip is fitted to an end periphery of a door panel and an end periphery of a door waist reinforcement at a door waist of the automobile, and relates to a method of producing the door panel structure.

2. Description of Related Art

A conventional door panel structure for an automobile includes a waist flange that corresponds to an end periphery of a door panel and an end periphery of a door waist reinforcement which are joined with each other at a door waist of the automobile. A weather strip having a generally U-shaped section is fitted to the door waist flange from an upper side of the waist flange.

At the waist flange of the conventional door panel structure to which the weather strip is fitted, the door panel and the door waist reinforcement are joined and in intimate contact with each other and thereby have a relatively thin thickness. Therefore, the weather strip that is fitted to the waist flange has an opening having a narrow width corresponding to the thin thickness of the waist flange.

It is necessary to use a molding die having a narrow die head in order to form the weather strip having such a narrow opening width. This results in deterioration in durability of the molding die.

For this reason, the opening width of the weather strip is increased upon forming the weather strip, as compared to an opening width in actual usage thereof, and after forming the weather strip, the opening width of the weather strip is reduced by pressing, etc., and narrowed so as to adapt to the thin thickness of the waist flange. The weather strip is made of a rubber and provided inside thereof with a plastically deformable core material.

Since, the work of reducing the opening width of the weather strip so as to adapt to the thin thickness of the waist flange is conducted after forming the weather strip as described above, the work efficiency is deteriorated to thereby cause an increase in the production cost.

BRIEF SUMMARY OF THE INVENTION

The present invention has been made in view of the above-described problems. It is an object of the present invention to provide a door panel structure and a method of producing the door panel structure which eliminates the work in connection with reducing the opening width of the weather strip, while maintaining the accuracy of fitting to the end peripheries of the door panel and the door waist reinforcement, namely, the joined end peripheries of the door panel and the door waist reinforcement. Thereby the production cost of the weather strip is reduced.

In an embodiment, the invention provides a door panel structure for an automobile. The door panel structure includes a door panel, and a reinforcement that reinforces the door panel. The door panel and the reinforcement have respective upper end portions which are connected to each other at multiple portions along a fore-and-aft direction, and are spaced from each other at at least one portion other than the multiple portions.

In another embodiment, the invention provides a method of producing a door panel structure for an automobile. The method includes providing a combined upper end portion of a door panel and an upper end portion of a reinforcement with a thickness in a width direction of the automobile such that the upper end portions of the door panel and the reinforcement are spaced apart at at least one portion along a fore-and-aft direction, and such that a weather strip is fitable to the upper end portions of the door panel and the reinforcement.

In the door panel structure according to an embodiment of the present invention, upper end peripheries of the door panel and the door waist reinforcement at the door waist are substantially spaced apart from each other. Therefore, a weather strip that is fitted to the substantially spaced upper end peripheries of the door panel and the door waist reinforcement can be formed such that the opening width of the weather strip is increased corresponding to the spacing between the upper end peripheries of the door panel and the door waist reinforcement. This results in dispensing with a molding die having a narrow die head corresponding to the opening width of the weather strip upon producing the weather strip. Therefore, the strength of the molding die can be enhanced to thereby increase durability of the molding die. Further, the work of reducing the opening width of the weather strip can be eliminated to thereby reduce the production cost and enhance the fitting accuracy of the weather strip with respect to the upper end peripheries of the door panel and the door waist reinforcement.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 3A is a cross section taken along line A-A of FIG. 2;

FIG. 3B is a cross section taken along line B-B of FIG. 2;

FIG. 3C is a cross section taken along line C-C of FIG. 2;

DETAILED DESCRIPTION OF THE PREFERRED EMBODIMENTS

Hereinafter, embodiments of the invention are explained with reference to the drawings.

Figure 1:
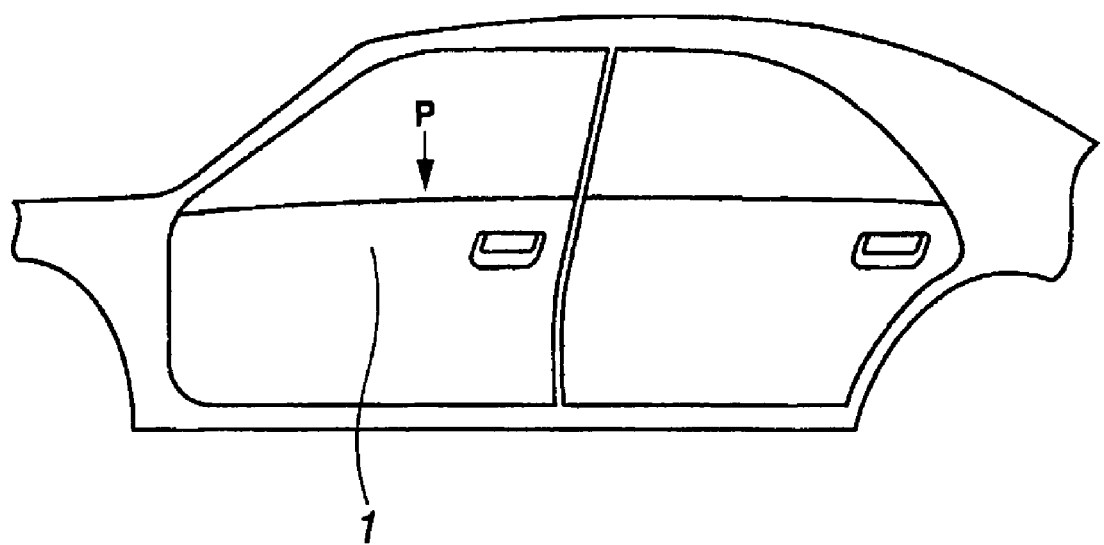
FIG. 1 is a side view of a part of an automobile to which a door panel structure of a first embodiment of the invention is applied.
Figure 2:
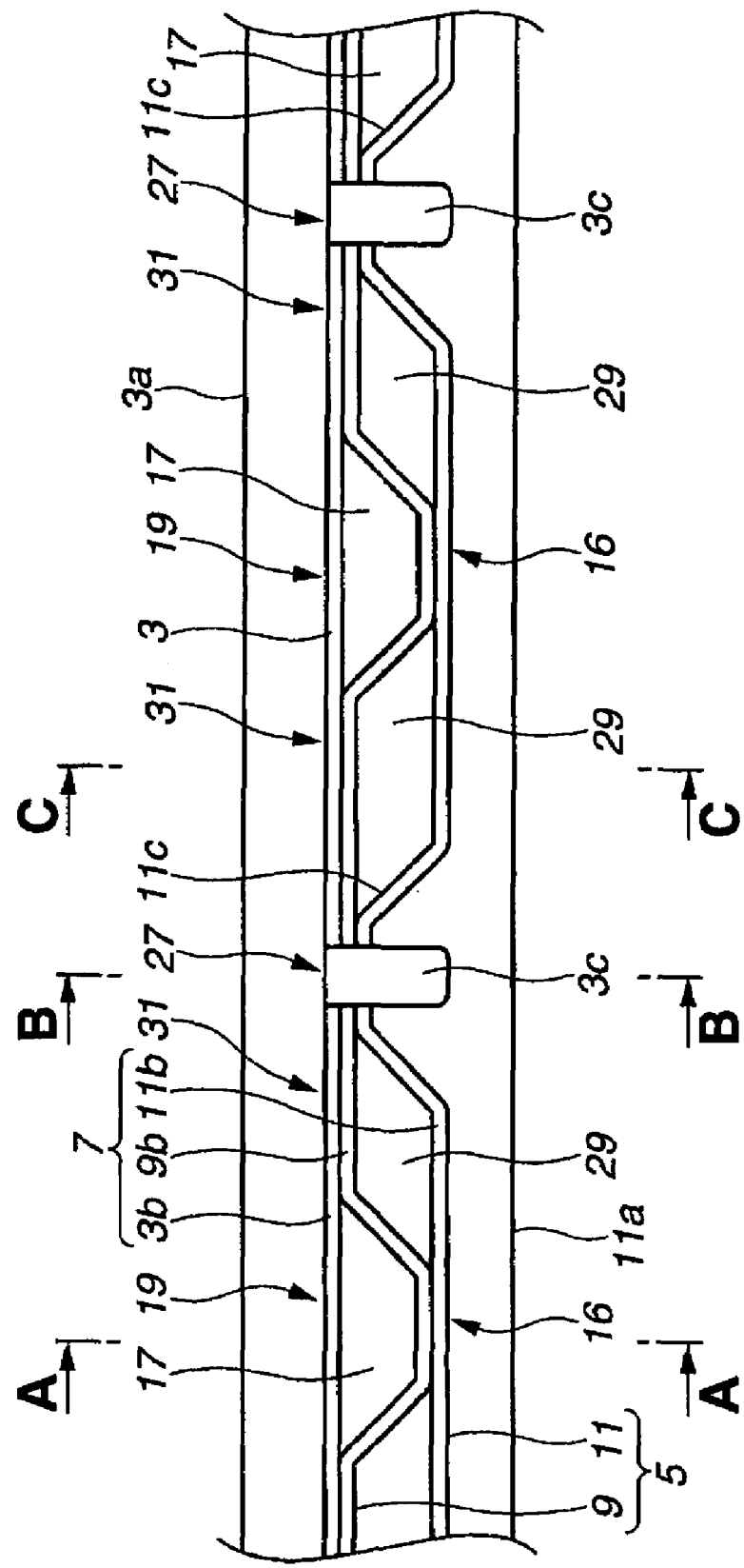
FIG. 2 is a plan view of a waist flange of the door panel structure at a door waist of the automobile shown in FIG. 1, when viewed from a direction of arrow P shown in FIG. 1.

FIG. 1 is side view of a part of an automobile to which a door panel structure of a first embodiment of the invention is applied. FIG. 2 is a plan view of waist flange 7 of the door panel structure at door waist 1 of the automobile as shown in FIG. 1, when viewed from a direction of arrow P shown in FIG. 1. Waist flange 7 includes door panel 3 (i.e. inner panel) and door waist reinforcement 5 at door waist 1.

FIG. 3A is a cross section taken along line A-A of FIG. 2, FIG. 3B is a cross section taken along line B-B of FIG. 2, and FIG. 3C is a cross section taken along line C-C of FIG. 2. An up-and-down direction in FIGS. 3A-3C indicates a vertical direction of the automobile.

Door waist 1 of the automobile includes door panel 3 having projecting portion 3a as shown in FIGS. 3A-3C. Projecting portion 3a projects toward an inside of the automobile body and extends over a length of the automobile in a fore-and-aft direction of the automobile body (in a direction perpendicular to a paper surface of FIGS. 3A-3C). Door waist reinforcement 5 is provided corresponding to projecting portion 3a.

Door waist reinforcement 5 includes two panels, namely, inner reinforcement 9 disposed on a side of door panel 3, and outer reinforcement 11 disposed on an opposite side of door panel 3.

As shown in FIGS. 3A-3C, inner reinforcement 9 is formed with projecting portion 9a that projects in the same direction as projecting portion 3a of door panel 3, and outer reinforcement 11 is formed with projecting portion 11a that projects in a direction opposite to projecting portion 9a. Closed-section portion 13 extends in the fore-and-aft direction of the automobile body and is formed between projecting portions 9a and 11a. With the provision of closed-section portion 13, strength of door waist 1 can be enhanced.

Lower connecting portion 15 is disposed in a position lower than closed-section portion 13. Lower connecting portion 15 is formed by connecting and fixing inner reinforcement 9 and outer reinforcement 11 to each other through spot welding and then connecting and fixing the connecting portion of inner reinforcement 9 and outer reinforcement 11 to door panel 3 by spot welding. Lower connecting portion 15 has a same shape in the direction perpendicular to the paper surface of FIGS. 3A-3C, namely, in the fore-and-aft direction of the automobile body.

On the other hand, waist flange 7 is disposed in a position higher than closed-section portion 13. Waist flange 7 includes flange 3b of door panel 3, flange 9b of inner reinforcement 9, and flange 11b of outer reinforcement 11. Waist flange 7 has a cross-section construction that is changed in the fore-and-aft direction of the automobile body as shown in FIGS. 3A-3C.

As shown in FIG. 3A, flange connecting portion 16 is formed by connecting and fixing flange 9b of inner reinforcement 9 and flange 11b of outer reinforcement 11 to each other through spot welding. Flange connecting portion 16 and flange 3b of door panel 3 are spaced from each other in a width direction of the automobile body so that inner dimension M and outer dimension L therebetween are defined. Flange connecting portion 16 and flange 3b cooperate to form spaced portion 19 which defines opening 17 on an upper side of spaced portion 19. In this connection, a space is positively formed between flange connecting portion 16 and flange 3b. The space is not the type of clearance formed around a spot-welded portion. Usually, when two panels are subjected to spot welding, a portion around the spot-welded portion of the panels is slightly raised up like a crater. Therefore, there is a slight clearance between the door and the reinforcement which were subjected to spot welding. As used herein, spaced does not mean a state where there is a slight clearance, rather spaced means that a space is formed between the door panel and the reinforcement, for example with a provision of a projection formed on one of the door panel and the reinforcement.

The above-described outer dimension L corresponds to a space between respective outer surfaces of door panel 3 and door waist reinforcement 5 at a position where spaced portion 19 is present.

Figure 4:
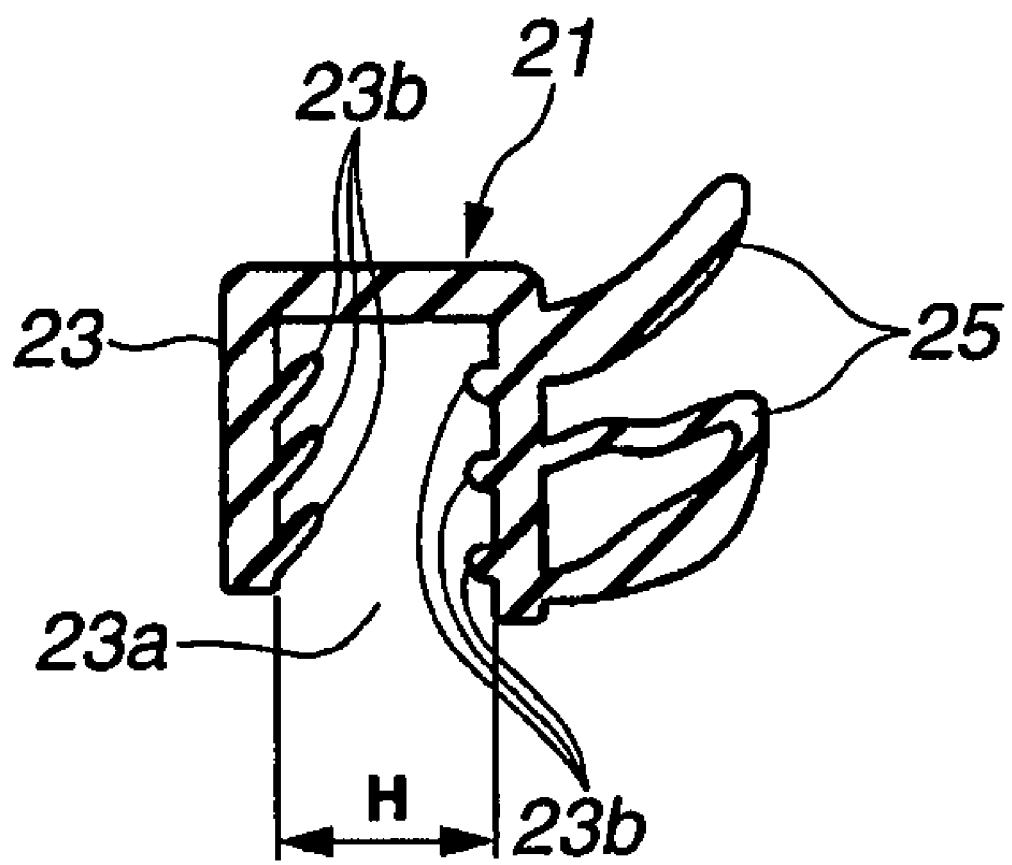
FIG. 4 is a cross section of a weather strip that is used in the door panel structure shown in FIG. 2.

The outer dimension L is substantially equal to opening width H of opening 23a of base 23 of weather strip 21 as shown in FIG. 4. Waist flange 7 is inserted into opening 23a of base 23 of weather strip 21 and fitted thereto. As shown in FIG. 4, a plurality of elastic projections 23b are provided on an inner surface of base 23 of weather strip 21. Lip portions 25 are provided on an outer surface of one of the side walls of base 23 which are opposed to each other in the width direction of the automobile body. Lip portions 25 come into sliding contact with a surface of a window shield panel (e.g. door glass), not shown.

Waist weather strip 21 shown in FIG. 4 may be made of rubber and may have a core, not shown, therein which is integrally formed with weather strip 21.

As shown in FIG. 3B, flange 9b of inner reinforcement 9 is located at a position offset from the position shown in FIG. 3A. At the offset position, flange 9b further projects toward flange 3b of door panel 3 so as to contact flange 3b, in contrast to the position shown in FIG. 3A. In addition, as shown in FIG. 2, flange 11b of outer reinforcement 11 is formed with embossed portion 11c. Embossed portion 11c serves as a projection that further projects toward door panel 3 as compared to the position shown in FIG. 3A.

With the arrangement shown in FIG. 3B, flange 9b, flange 11b with embossed portion 11c, and flange 3b are disposed in an overlapped relation to each other. Flange 9b, flange 11b with embossed portion 11c, and flange 3b in the thus-overlapped state are connected and fixed to each other by spot welding, so that connecting portion 27 is formed, having the effect of increasing the strength of the door panel structure.

Further, bend 3c is disposed on an upper end portion of flange 3b at connecting portion 27 in the vertical direction of the automobile body. Bend 3c is bent so as to project in a direction opposite to the projection direction of embossed portion 11c and thus serves as a projection. Bend 3c has a length in the projecting direction which is substantially equal to outer dimension L as shown in FIG. 3A.

Since waist weather strip 21 shown in FIG. 4 has width H of opening portion 23a that is substantially equal to projection length L of bend 3c of door panel 3, waist weather strip 21 can also be suitably fitted to connecting portion 27 as well as spaced portion 19 shown in FIG. 3A. Accordingly, waist weather strip 21 can maintain a predetermined fitting force in the fitted state to thereby ensure the sealability.

As shown in FIG. 3B, outer reinforcement 11 is formed with step 11d that is located on a lower side of connecting portion 27 in the vertical direction of the automobile body and on its surface toward an outside of the automobile body. Step 11d has an outer surface, namely, a surface on the right side in FIG. 3B, which is flush with a tip end of bend 3c. In other words, a space between respective outer surfaces of step 11d and flange 3b of door panel 3 is equal to projection length L of bend 3c.

Figure 5:
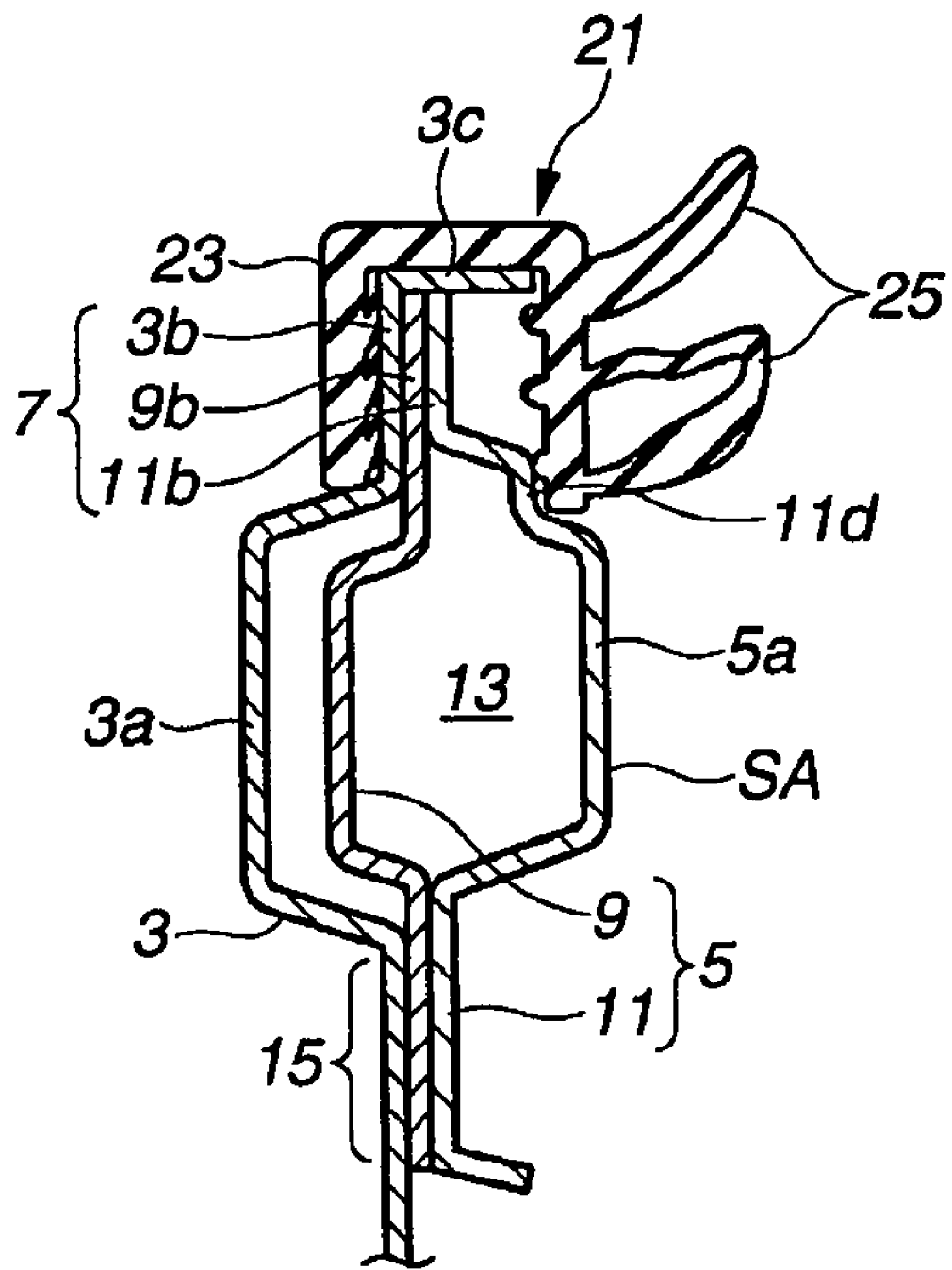
FIG. 5 is a cross section showing a fitting state of the weather strip of FIG. 4 with respect to the waist flange, taken along line B-B of FIG. 2.

Accordingly, as shown in FIG. 5, waist weather strip 21 that is fitted to connecting portion 27 shown in FIG. 3B has a lower end portion that pinches step 11d of outer reinforcement 11 and flange 3b of door panel 3.

Spaced portion 19 shown in FIG. 3A and connecting portion 27 shown in FIG. 3B are alternately arranged along waist flange 7 that extends in the fore-and-aft direction of the automobile, as shown in FIG. 2.

FIG. 3C shows an intermediate portion between spaced portion 19 shown in FIG. 3A and connecting portion 27 shown in FIG. 3B. In the intermediate portion, flange 9b of inner reinforcement 9 is placed in the same position as that shown in FIG. 3B in which flange 9b is butted against flange 3b of door panel 3, and flange 11b of outer reinforcement 11 is placed in the same position as that shown in FIG. 3A in which flange 11b is spaced from flange 9b so as to define opening 29 therebetween which is open upwardly.

In the intermediate portion shown in FIG. 3C, outer dimension L between respective outer surfaces of flange 3b of door panel 3 and flange 11b of outer reinforcement 11 is equal to outer dimension L shown in FIG. 3A and projection length L of bend 3c shown in FIG. 3B.

Accordingly, in the intermediate portion shown in FIG. 3C, flange 3b of door panel 3 and flange 11 of outer reinforcement 11 are spaced from each other and form spaced portion 31 defining opening 29 that is upwardly open similar to spaced portion 19 shown in FIG. 3A.

Next, a method of producing the above-described door panel structure is explained. First, inner reinforcement 9 and outer reinforcement 11 are connected and fixed to each other at lower portions thereof by spot welding to thereby form lower connecting portion 15 of sub-assembly part SA. Flange 9b of inner reinforcement 9 and flange 11b of outer reinforcement 11 are connected and fixed to each other by spot welding to thereby form flange connecting portion 16. Sub-assembly part SA that is constituted of the two panels, namely, inner reinforcement 9 and outer reinforcement 11, is thus produced.

More specifically, lower connecting portion 15 of sub-assembly part SA is formed by connecting the lower portions of inner reinforcement 9 and outer reinforcement 11 through spot welding at multiple portions which are suitably spaced from each other in the fore-and-aft direction of the automobile body. Flange connecting portion 16 is formed by connecting flange 9b of inner reinforcement 9 and flange 11b of outer reinforcement 11 through spot welding at multiple portions which are suitably equidistantly spaced from each other in the fore-and-aft direction of the automobile body as shown in FIG. 2.

Subsequently, the above-described sub-assembly part SA is assembled to door panel 3. Upon the assembling work, sub-assembly part SA is connected and fixed to door panel 3 by spot welding to thereby form lower connecting portion 15 of the door panel structure, and flanges 9b, 11b joined in the mutually butting state are connected and fixed to flange 3b of door panel 3 by spot welding to thereby form connecting portion 27 of the door panel structure at which three panels 9b, 11b and 3b are joined with each other.

More specifically, lower connecting portion 15 of the door panel structure is formed by connecting sub-assembly part SA and door panel 3 through spot welding at multiple portions which are suitably spaced from each other in the fore-and-aft direction of the automobile body. Connecting portion 27 of the door panel structure is formed by connecting flanges 9b, 11b and flange 3b through spot welding at multiple portions which are disposed between flange connecting portions 16 and suitably equidistantly spaced from each other in the fore-and-aft direction of the automobile body as shown in FIG. 2.

Subsequently, waist weather strip 21 shown in FIG. 4 is fitted to waist flange 7 of the thus-produced door panel structure.

In the above-described door panel structure according to the first embodiment, as shown in FIG. 3A, flange 3b of door panel 3 and flange connecting portion 16 of sub-assembly part SA in which flanges 9b, 11b of inner and outer reinforcements 9, 11 are joined with and fixed to each other through spot welding are spaced from each other to thereby provide spaced portion 19 having outer dimension L. In addition, as shown in FIG. 3C, there is provided spaced portion 31 having outer dimension L. Therefore, with the arrangement of spaced portions 19 and 31, waist weather strip 21 can be formed with the increased opening width H owing to the provision of outer dimension L.

Accordingly, it is possible to dispense with a molding die with a narrow die head, that has been used in the conventional art, upon producing weather strip 21. A molding die for weather strip 21 can be enhanced in strength at the die head that is inserted into opening 23a with increased width H upon molding, so that durability of the molding die can be increased. Further, it is possible to eliminate the work of reducing the width of opening 23a of weather strip 21 after forming weather strip 21. As a result, the production cost can be reduced, and the fitting accuracy of weather strip 21 with respect to waist flange 7 of the door panel structure can be enhanced.

Further, opening 17 that is upwardly open is provided at spaced portion 19 as shown in FIG. 3A, and opening 29 that is upwardly open between inner and outer reinforcements 9 and 11 is provided at spaced portion 31 as shown in FIG. 3C. Therefore, when the door panel structure of the embodiment is subjected to rust preventive coating, a rust preventive paint can readily enter an inside of the respective panels through openings 17 and 29 to thereby enhance the effect of rust prevention.

Further, as shown in FIG. 3B, there is provided bend 3c at connecting portion 27 in which flange 3b of door panel 3 and flanges 9b, 11b of inner and outer reinforcements 9, 11 are connected and fixed to each other through spot welding. Since bend 3c has the projecting length L that is substantially equal to outer dimension L at spaced portion 19 as shown in FIG. 3A, it is possible to ensure the fitting force of weather strip 21 relative to connecting portion 27 as well as the fitting force of weather strip 21 relative to spaced portion 19.

Further, as shown in FIG. 3B, outer reinforcement 11 is provided with step 11d on the lower side of connecting portion 27 in the vertical direction of the automobile body which is flushed with the tip end of bend 3c. With the provision of step 11d, waist weather strip 21 can be fitted to connecting portion 27 such that the lower end portion of waist weather strip 21 pinches step 11d and flange 3b of door panel 3 as shown in FIG. 5. This results in enhancing sealability at step 11d.

Further, as shown in FIG. 2, spaced portion 19 and connecting portion 27 are alternately arranged along waist flange 7 that extends in the fore-and-aft direction of the automobile body. With this alternating arrangement of spaced portion 19 and connecting portion 27, when fitted with waist weather strip 21, the closed-section portion having opening 17 at spaced portion 19 and the closed-section portion having opening 29 at spaced portion 31 are alternately formed along waist flange 7 that extends in the fore-and-aft direction of the automobile body. This results in enhancing rigidity of waist flange 7.

Further, door waist reinforcement 5 is constituted of the two panels, namely, inner reinforcement 9 that is disposed on the side of door panel 3 and outer reinforcement 11 that is disposed on the opposite side of door panel 3. Inner and outer reinforcements 9 and 11 are welded and joined with each other at spaced portion 19. On the other hand, inner and outer reinforcements 9 and 11 connected in the mutually butting state are welded and joined with flange 3b of door panel 3. Accordingly, the connecting strength at waist flange 7 can be sufficiently obtained.

Further, the space having outer dimension L between respective outer surfaces of door panel 3 and door waist reinforcement 5 at spaced portions 19 and 31 is substantially equal to the opening width H of weather strip 21 that is fitted to waist flange 7. Accordingly, weather strip 21 can be fitted to waist flange 7 in a suitable manner. Thus, the door panel structure with reliability can be provided.

Furthermore, sub-assembly part SA is formed by welding and joining inner and outer reinforcements 9 and 11 to each other at spaced portion 19 shown in FIG. 3A, and thereafter, sub-assembly part SA is connected to flange 3b of door panel 3 at connecting portion 27 shown in FIG. 3B. Accordingly, the work of assembling door waist reinforcement 5 with the two-panel structure to door panel 3 can be readily carried out. Further, door waist reinforcement 5 with the two-panel structure can enhance rigidity of door waist 1.

Figure 6:
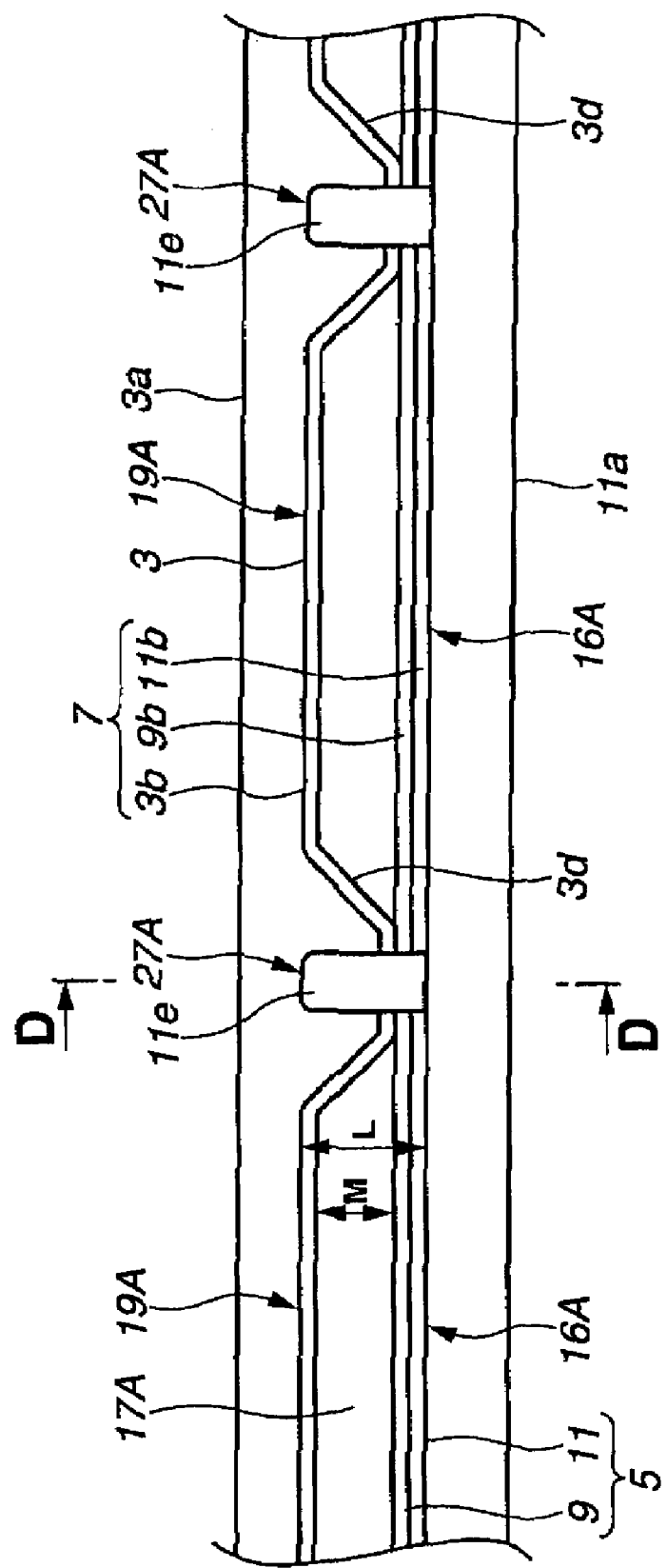
FIG. 6 is a plan view similar to FIG. 2, but showing the door panel structure of a second embodiment of the invention.
Figure 7:
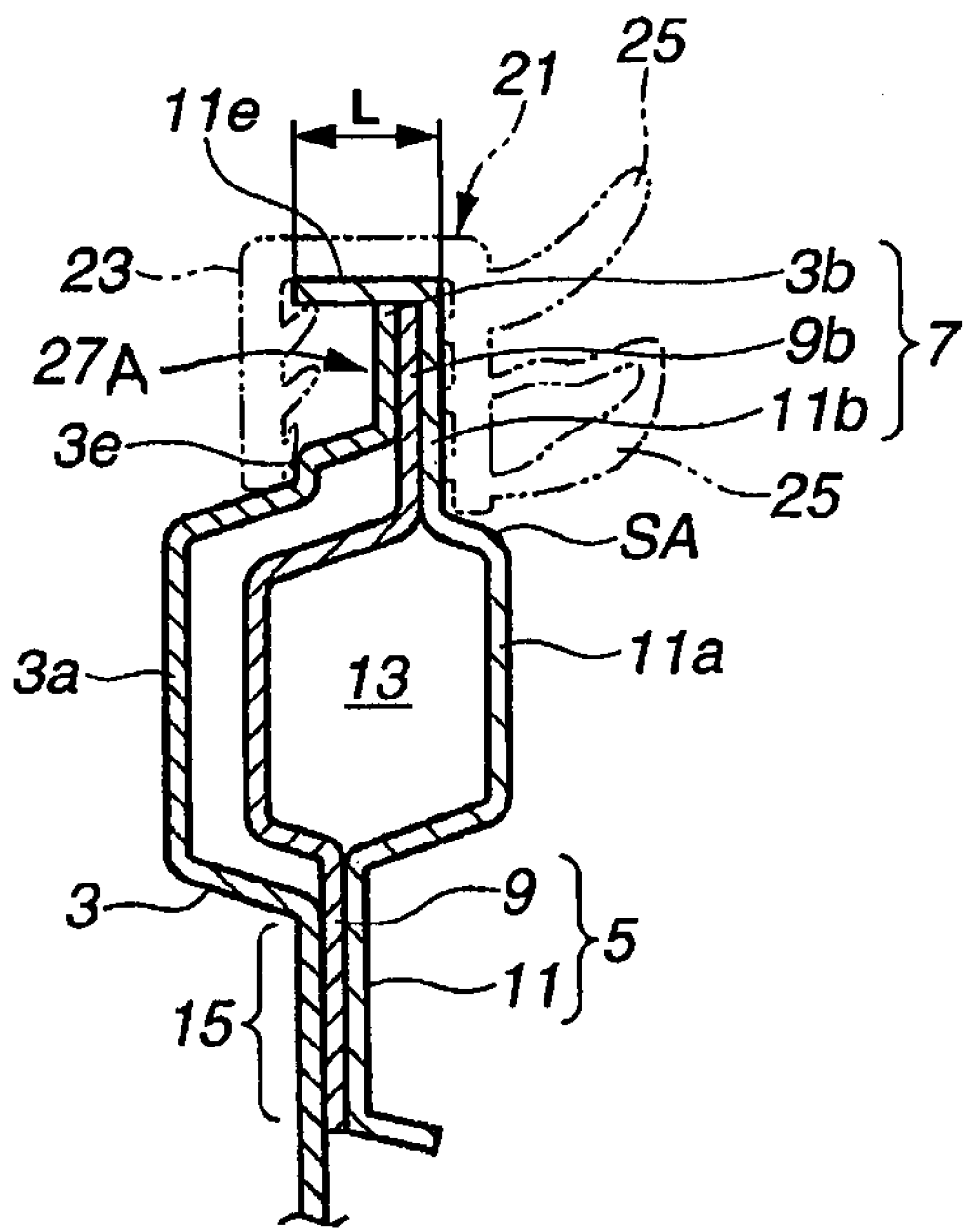
FIG. 7 is a cross section taken along line D-D of FIG. 6.

FIG. 6 is a plan view of the door panel structure of a second embodiment of the present invention. FIG. 7 is a cross section similar to FIG. 3B, but showing the cross section taken along line D-D of FIG. 6.

In the second embodiment, connecting portion 27 of FIG. 1 is modified as indicated at connecting portion 27A. Specifically, in the first embodiment, at waist flange 7 (flanges 3b, 9b and 11b) shown in FIG. 2, door panel 3 is in the form of a flat plate shape without projections and recesses in the fore-and-aft direction of the automobile body (i.e. in the right-and-left direction in FIG. 2). In contrast, in the second embodiment, inner reinforcement 9 and outer reinforcement 11 are in the form of a flat plate shape without projections and recesses in the fore-and-aft direction of the automobile body.

Further, similar to the first embodiment, flange connecting portion 16A is formed by connecting and fixing flat-plate shaped flanges 9b and 11b of inner and outer reinforcements 9 and 11 to each other at spaced portion 19A through spot welding.

Further, similar to spaced portion 19 in the first embodiment, at spaced portion 19A, flange connecting portion 16A and flange 3b of door panel 3 are spaced from each other to thereby provide inner dimension M and outer dimension L, and define opening 17A that is upwardly open in the vertical direction of the automobile body.

In contrast, door panel 3 of the second embodiment has embossed portion 3d at connecting portion 27A which serves as a projection projecting toward door waist reinforcement 5. Flange 3b formed with embossed portion 3d, flange 9b and flange 11b are connected and fixed to each other through spot welding.

Further, bend 11e is provided on an upper end portion of flange 11b of outer reinforcement 11 at connecting portion 27A. Bend 11e serves as a projection that is bent so as to project toward the inside of the automobile (the upper side in FIG. 6).

Bend 11e has a projection length that is equal to outer dimension L at spaced portion 19A similar to the projection length of bend 3c of the first embodiment. That is, an amount of projection of bend 11e is substantially equal to the projection length of embossed portion 3d described above.

Further, as shown in FIG. 7, door panel 3 is provided with step 3e that is disposed on a side of a compartment of the automobile on a lower side of connecting portion 27 in the vertical direction of the automobile body in place of step 11d shown in FIG. 3B. Step 3e has a surface on the left side in FIG. 7 which is flush with a tip end of bend 11e.

As shown in FIG. 7, weather strip 21 is fitted to connecting portion 27A such that a lower portion of the tip end portion of weather strip 21 pinches step 3e and flange 11b of outer reinforcement 11 similar to weather strip 21 used in the first embodiment. Accordingly, similar to the first embodiment shown in FIG. 5, sealability can be enhanced in the second embodiment.

Other structural features of the door panel structure of the second embodiment are the same as those of the door panel structure of the first embodiment. In the method of producing the door panel structure of the second embodiment, sub-assembly part SA that is constituted of inner and outer reinforcements 9 and 11 is formed by connecting and fixing flanges 9b and 11b of inner and outer reinforcements 9 and 11 to each other at spaced portion 19A. Subsequently, sub-assembly part SA is connected to flange 3b of door panel 3, so that the door panel structure of the second embodiment is produced.

Figure 8:
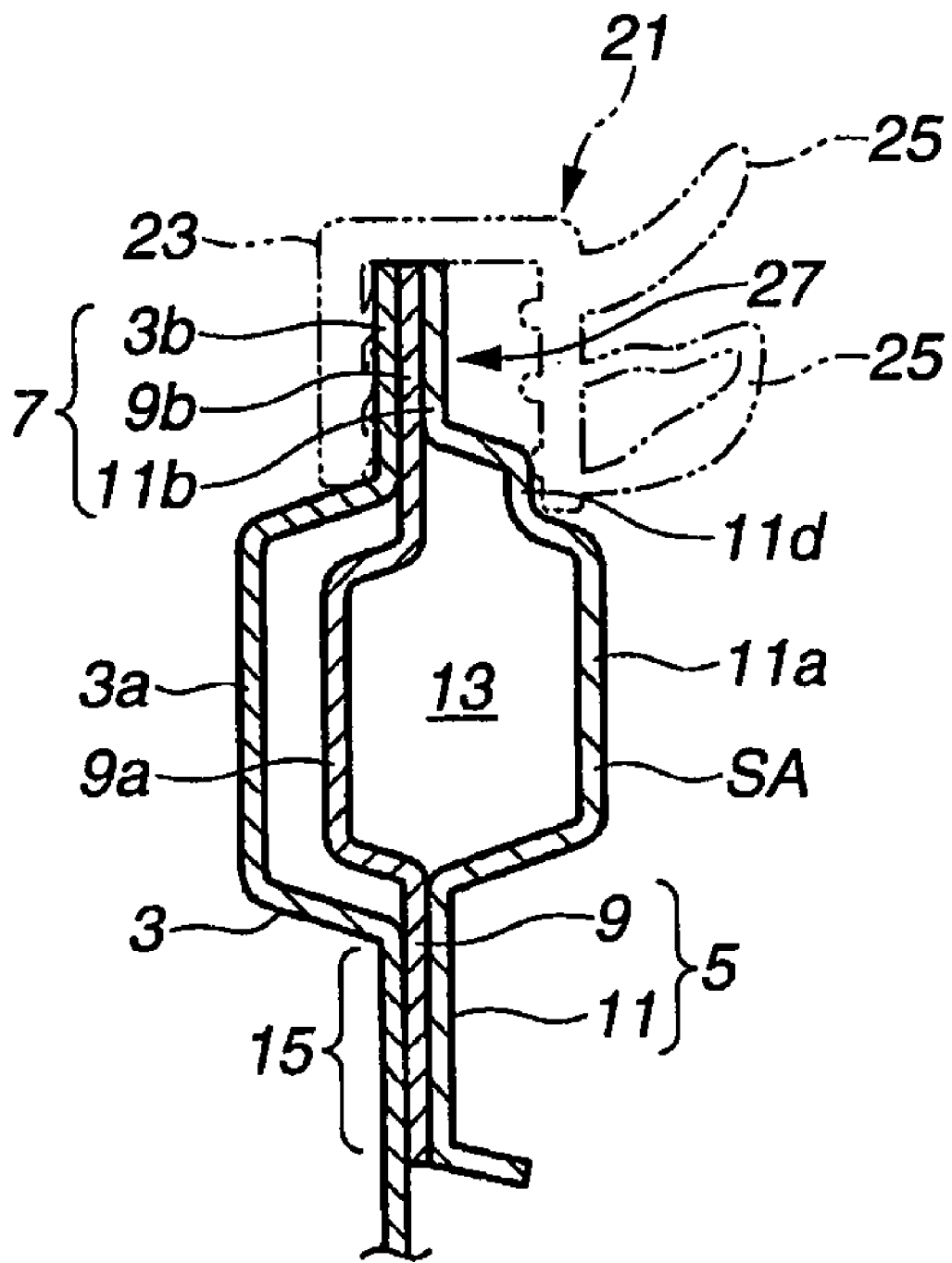
FIG. 8 is a cross section similar to FIG. 3B, but showing the door panel structure of a third embodiment of the invention.

FIG. 8 is a cross section similar to FIG. 3B, but shows the door panel structure of a third embodiment of the invention. In the third embodiment, bend 3c of door panel 3 in the first embodiment as shown in FIGS. 2 and 3B is omitted.

Figure 9:
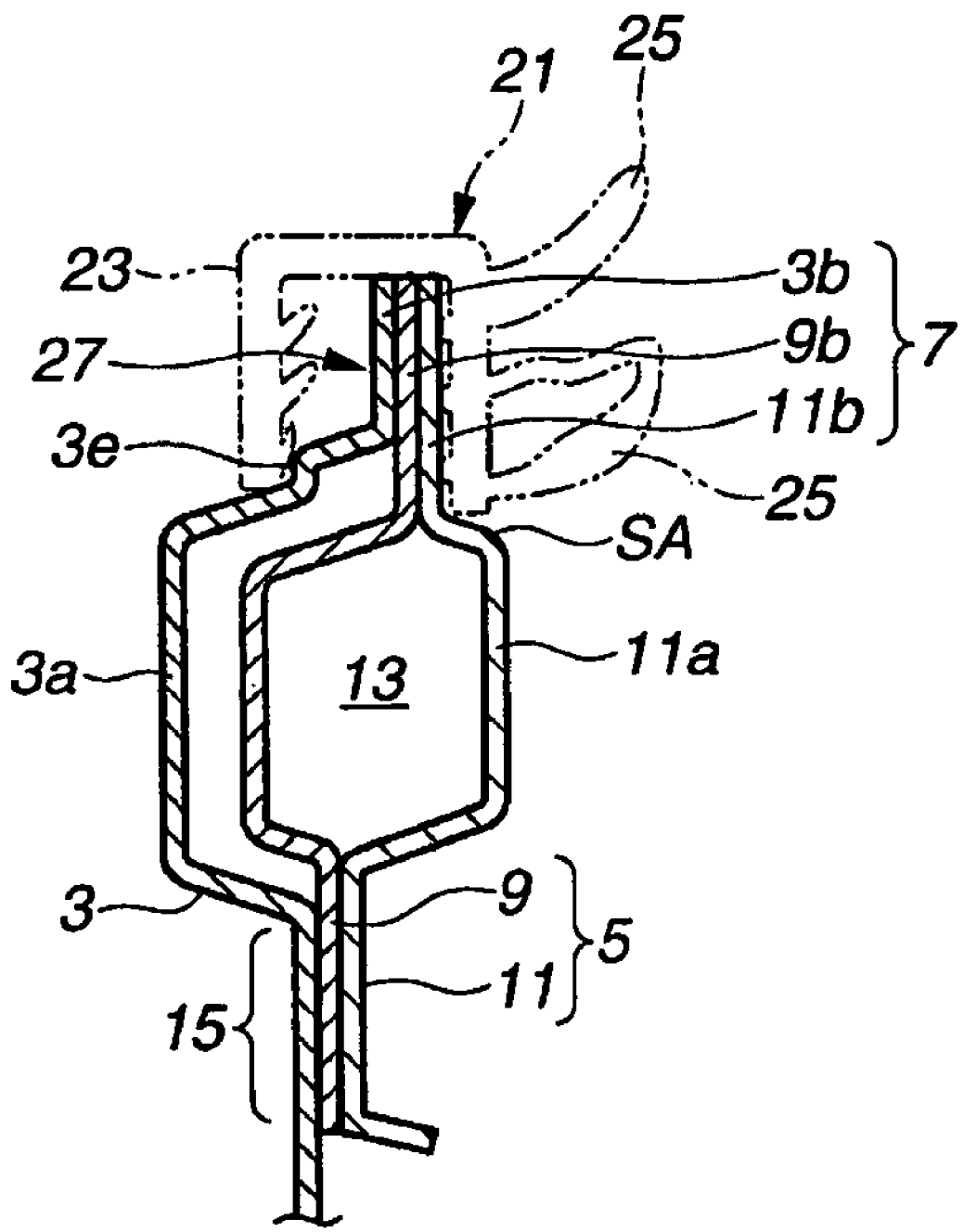
FIG. 9 is a cross section similar to FIG. 3B, but showing the door panel structure of a fourth embodiment of the invention.

FIG. 9 is a cross section similar to FIG. 7, but shows the door panel structure of a fourth embodiment of the invention. In this embodiment, bend 11e of outer reinforcement 11 in the second embodiment as shown in FIGS. 6 and 7 is omitted.

The third and fourth embodiments as shown in FIGS. 8 and 9 can perform the same effects as those of the first and second embodiments except for the effects that can be obtained with the provision of bends 3c and 11e in the first and second embodiments.

While the invention has been disclosed with reference to certain preferred embodiments, numerous modifications, alterations, and changes to the described embodiments are possible without departing from the sphere and scope of the invention, as defined in the appended claims and equivalents thereof. For example, in the embodiment illustrated in FIG. 3B, the upper end of flange 11b may be joined with a tip end portion of bend 3c. In the embodiment illustrated in FIG. 7, the upper end of flange 3b may be joined with a tip end portion of bend 11e. Accordingly, it is intended that the invention not be limited to the described embodiments, but that it have the full scope defined by the language of the following claims.

The invention claimed is:

1. A door panel structure for an automobile, the door panel structure comprising:
    a door panel; and
    a reinforcement that reinforces the door panel;
    wherein the door panel and the reinforcement have respective upper end portions which are connected to each other at multiple portions along a fore-and-aft direction, and are spaced from each other at at least one portion other than the multiple portions, such that a weather strip is fitable to the upper end portions of the door panel and the reinforcement.

2. The door panel structure as claimed in claim 1, wherein one of the door panel and the reinforcement is formed with a bend on the upper end portion which projects toward the other of the door panel and the reinforcement.

3. The door panel structure as claimed in claim 2, wherein the other of the door panel and the reinforcement is connected to the one of the door panel and the reinforcement at a lower side of the bend with respect to a vertical direction of the automobile.

4. The door panel structure as claimed in claim 2, wherein the door panel or the reinforcement which is formed with the bend has a step on a lower side of the upper end portion with respect to the vertical direction of the automobile, and the step has a tip end that is substantially flush with a tip end of the bend.

5. The door panel structure as claimed in claim 1, wherein the reinforcement includes an inner reinforcement panel that is disposed on a side of the door panel and an outer reinforcement panel that is disposed adjacent the inner reinforcement panel.

6. The door panel structure as claimed in claim 1, wherein a width of the upper end portions of the door panel and the reinforcement is substantially equal to an opening width of a weather strip that is fitted to the upper end portions of the door panel and the reinforcement.

7. A method of producing a door panel structure for an automobile, the method comprising:
providing a combined upper end portion of a door panel and an upper end portion of a reinforcement with a thickness in a width direction of the automobile such that the upper end portions of the door panel and the reinforcement are spaced apart at at least one portion along a fore-and-aft direction, and such that a weather strip is fitable to the upper end portions of the door panel and the reinforcement.

8. A door panel structure for an automobile, the door panel structure comprising:
a door panel; and
means for reinforcing the door panel;
wherein the door panel and the means for reinforcing the door panel have respective upper end portions which are connected to each other at multiple portions along a fore-and-aft direction, and are spaced from each other at at least one portion other than the multiple portions, such that a weather strip is fitable to the upper end portions of the door panel and the reinforcement.

9. The door panel structure as claimed in claim 2, wherein the other of the door panel and the reinforcement is joined with a tip end portion of the bend.

10. The door panel structure as claimed in claim 5, wherein the inner reinforcement panel and the outer reinforcement panel are connected and fixed to each other at the portion at which the door panel and the reinforcement are spaced from each other.

* * * * *